United States Patent Office — 3,594,198, Patented July 20, 1971

3,594,198
PHOTOTROPIC GLASS
Lowell L. Sperry, Lower Burrell, Pa., assignor to PPG Industries, Inc., Pittsburgh, Pa.
No Drawing. Continuation-in-part of application Ser. No. 708,426, Feb. 26, 1968, which is a continuation-in-part of application Ser. No. 537,682, Mar. 28, 1966, which in turn is a continuation-in-part of application Ser. No. 236,716, Nov. 9, 1962, all now abandoned. This application Apr. 9, 1970, Ser. No. 27,166
Int. Cl. C03c 3/14, 3/08, 3/26
U.S. Cl. 106—54                                 7 Claims

ABSTRACT OF THE DISCLOSURE

The present invention relates to phototropic glass and to processes for producing a phototropic glass. A phototropic glass is one which has the ability to color or darken in color when radiated with light of a particular wave length region and whose induced color fades rapidly, that is, within a few minutes after the exciting radiation is removed. The present invention particularly relates to glasses which exhibit a phototropic effect when radiated with ultraviolet light or sunlight. The invention especially relates to phototropic potassium borate glasses comprising a glass body having in at least a portion thereof microcrystals of at least one silver halide such as silver chloride, silver bromide, or silver iodide or mixtures thereof.

CROSS REFERENCES TO RELATED APPLICATIONS

This application is a continuation-in-part of application Ser. No. 708,426 filed Feb. 26, 1968 which is a continuation-in-part of application Ser. No. 537,682 filed Mar. 28, 1966 which is a continuation-in-part of application Ser. No. 236,716 filed Nov. 9, 1962, all abandoned.

BACKGROUND OF THE INVENTION

A phototropic glass has many uses. A phototropic glass can be incorporated into ordinary eyeglasses which automatically become sunglasses when the wearer goes outdoors; into automobile windshields which darken and fade in response to sunlight; into camera lenses which regulate the amount of light allowed to reach the film; into windows and glass walls for buildings and homes to automatically regulate the amount of radiant energy allowed to pass into the building's interior and into calibrated glass detectors which yield an almost instantaneous reading of the ultraviolet and higher energy radiation striking the glass. Phototropic glasses may be transparent, translucent or opaque depending on the particular use. Transparent glasses are preferred where the glass is used for viewing purposes. Translucent or opaque glasses may be used as building spandrels or closures where control of glare and/or transmission of radiant energy are the primary concerns. Radiation detecting glasses can be transparent, translucent or opaque. These few examples indicate the present invention's usefulness.

SUMMARY OF THE INVENTION

It has been discovered according to this invention that a phototropic glass can be produced by incorporating small effective amounts of a silver halide, such as silver chloride, silver iodide or silver bromide into a potassium borate glass which may contain small amounts of $SiO_2$. The invention will be further described hereinafter with regard to the presence of silver chloride crystals in a glass; however, it is to be understood that the invention is not so limited.

The glasses are produced by melting conventional batch ingredients under oxidizing conditions and cooling the glasses to room temperature by conventional methods. Some glasses, depending upon the base ingredients of the glass and the proportion of silver chloride crystals in the glass are phototropic as melted and cooled to room temperature, whereas other glasses require reheating to produce the phototropic properties in the glass.

Silver chloride has a positive temperature coefficient of solubility in most glasses, that is, the solubility of the silver chloride in the glass increases with increasing temperature of the glass. This makes it possible to dissolve silver chloride or its ingredients, silver and chloride ions, in molten glass at a relatively high temperature and thereafter to precipitate silver chloride in the glass at a lower tempearture.

Precipitation of the silver chloride crystals is preceded by a nucleation process. Until nucleation occurs, precipitation does not occur even though the glass is held for some time below the temperature at which it is saturated with respect to silver chloride. The maximum temperature at which nucleation occurs depends upon the concentration of atomic silver in the glass. The maximum temperature is highter when the concentration of atomic silver is greater. The equilibrium $2Ag^+ + O = \rightleftharpoons 2Ag + \tfrac{1}{2}O_2$ requires that there always be a finite concentration of atomic silver in the glass. The atomic silver is detected in the glass by virtue of its fluorescence. This implies that a heterogenous nucleation process occurs, and it is believed that the nuclei consist of aggregates of neutral silver atoms. Nucleation occurs at a rate which depends directly upon the temperature and the concentration of atomic silver. It is possible to control the concentration of nuclei and therefore the concentration of silver chloride crystals which subsequently grow around them by choosing appropriate combinations of time and temperature in the nucleation heat treatment.

After nucleation, the precipitation of the silver halide crystals occurs at a rate which depends directly upon the concentration of the dissolved silver chloride and the temperature of the glass. It is, therefore, possible to control the final silver chloride particle size by choosing appropriate combinations of time and temperature for the precipitation heat treatment as will be hereinafter more fully described.

Whether or not the glasses require further heat treatment after the melting and initial cooling to room temperature to render them phototropic depends upon the glass composition and the rate of cooling of the molten glass. If the highest temperature at which nucleation can occur is higher than or about the same as the temperature at which precipitation can occur in a particular glass, the glass can become phototropic upon cooling if cooled slowly enough to permit nucleation and precipitation. If, however, the highest temperature at which nucleation can occur is lower than the temperature at which precipitation can occur, the glass must be cooled to nucleate the glass and then reheated to precipitate the silver chloride crystals at a higher temperature.

The particle size of the silver chloride crystals and the formation of other crystalline phases in the glass by devitrification are the principal factors which determine whether the glasses are transparent, translucent or opalescent. The volume concentration of the crystals in the glass and the thickness of the glass determine to a lesser extent whether the glass is transparent, translucent or opaque.

Light passing through the glass is scattered due to a difference in the refractive index between the silver chloride crystals and the glass. Thus, smaller particles cause less light scattering and if the silver chloride particles are sufficiently small, the glass is transparent. For example, when the particle size of the crystals is less than about 0.1 to 0.5 micron, the glass is substantially transparent. When the particle size of the silver chloride crystals is larger than about 0.5 micron, the glasses are translucent or opalescent.

The preferred crystal size in the present invention is between 0.005 and 1.0 micron, but the crystal size can range from 0.0025 to 2.0 microns and still permit the production of useful glass products.

Depending upon the base glass composition, amounts of silver of the order of about 0.2 to 1.0 percent by weight based upon the weight of the glass are preferred. The amount of silver can range, however, between 0.1 and 4.0 percent by weight based on the total weight of the glass and still permit the glass to be phototropic. It has been found that with too little total silver, the silver chloride crystals are not formed. A very small portion of the total silver is present as free silver which acts as a nucleating agent for the formation of the silver chloride crystals. An excessive concentration of free silver causes discoloration of the glass.

Chlorine should be present in ionic form and in sufficient concentration to react with most of the silver. An excess of chloride up to about 3 to 4 times the stoichiometric amount of chloride based upon the weight of silver can be present in the glass. The preferred chloride content is between 0.03 and 0.6 percent by weight of the total weight of the glass, but can be as low at 0.01 percent or as high as 2.0 percent and still permit varying degrees of phototropic response to be developed in the glass.

Several factors must be considered in the selection of the base glass composition. First, the silver chloride must be sufficiently soluble at the glass melting temperature, and the solubility must have a positive temperature coefficient. The base glass should be sufficiently acidic so that there is not an excessive tendency for the dissolved silver ions to be reduced to free silver at the melting temperature. Further, the base glass should not devitrify during the heat treatment required to obtain nucleation and precipitation of the silver chloride crystals.

Borate glasses have a greater tendency to devitrify than borosilicate glasses during the heat treatment employed to form the silver chloride crystals. It has been found that $SiO_2$ and $B_2O_3$ in combination as the principal network formers permit the production of phototropic glasses which have less tendency to devitrify during manufacture than pure borate glasses.

A suitable family of glasses contains in percent by weight of about at least 63 percent boric oxide, 0 to 17 percent silica and up to 25 percent potassium oxide as the base glass containing the silver halide.

An important consideration in the choice of batch materials for the production of small scale laboratory melts is the volatility of chlorides at the glass melting temperatures. Chlorides, such as silver chloride and alkali metal chlorides, are extremely volatile in glass melts and so the lowest possible melting temperature and the shortest possible melting time is preferred. Therefore, it is beneficial to use a base glass composition which can be melted quickly at a relatively low temperature. It is also advisable to choose batch ingredients that do not evolve large amounts of gases such as $CO_2$ and $H_2O$ which tend to sweep out volatile chloride vapors from the melting batch. These considerations are of much less importance in the commercial production of large quantities of the glass.

It is advisable to include a batch ingredient that evolves some oxygen or other strong oxidizing agent in order to consume traces of organic impurities which might otherwise cause excessive reduction of silver ion to atomic silver. Relatively low temperature reducing agents may be included in the batch to obtain controlled reduction of the silver ion to atomic silver for controlled nucleation. Such reducing agents are well known and include antimony oxide and arsenic oxide.

As mentioned above, the cooling of the molten glass may result in the production of a phototropic glass if the temperature range in which the nucleation occurs is higher than the temperature range in which the precipitation of the silver chloride crystal occurs. Slow and controlled cooling of the molten glass can be utilized to obtain the desired amount of nucleation in the nucleation temperature range and the desired amount of crystal growth in the precipitation temperature range.

Another method of controlling nucleation and precipitation of silver chloride crystals involves limiting the concentration of silver and chloride ions in the glass melt to such an extent that spontaneous precipitation does not occur when the glass is poured onto a cold surface and rapidly cooled, such as by pouring the molten glass onto a metal or graphite surface and cooling the glass to room temperature at atmospheric conditions. If the silver chloride and atomic silver concentrations in the glass are not too low, nucleation and precipitation will result from reheating such a glass up to about the softening point or higher. Since the reheating cycle is more easily controlled, better reproducibility of heat treatment is possible and the silver chloride particle size and concentration can be better controlled so that the same glass can be readily reproduced.

The invention is further explained by the following examples:

EXAMPLE I

A phototropic glass was prepared by melting the following ingredients in the amounts set forth below:

| | Weight in grams |
|---|---|
| KCl | 0.3 |
| $AgNO_3$ | 0.5 |
| $B_2O_3$ | 4.0 |
| $K_2B_4O_7 \cdot 5H_2O$ | 8.0 |

These ingredients were thoroughly mixed and placed in a ceramic crucible. The ceramic crucible was composed of 70 percent by weight of powdered fused silica and 30 percent by weight of clay. The mixture was heated at 1100° C. for about 15 minutes to produce a molten glass. This glass was poured in room atmosphere onto a graphite block. The molten glass was colorless and clear and upon cooling became white and opaque. The glass turned purple under exposure to a commercial type R–S sunlamp having a light source emitting near ultraviolet radiation as well as visible and infrared radiation, and the purple color faded away completely in one minute when the sunlamp was removed. The above batch yields a base glass having a calculated composition in percent by weight of 76.1 percent $B_2O_3$ and 23.9 percent $K_2O$.

Example II below illustrates a typical potassium borosilicate glass.

EXAMPLE II

A phototropic glass was made from a base glass having a composition in percent by weight of 20 percent $K_2O$, 17 percent SiO and 63 percent $B_2O_3$. This glass was prepared by mixing the following ingredients in the amounts set forth below:

| Ingredient: | Parts by weight |
|---|---|
| $K_2B_4O_7 \cdot 5H_2O$ | 40 |
| $B_2O_3$ | 20 |
| $SiO_2$ | 10 |

Silver, added as 2.0 grams of $AgNO_3$, and chloride added as 0.8 gram of KCl, were added to the ingredients set forth above.

EXAMPLE III

The following phototropic glasses were made with the batch ingredients set forth below by heating the ingredients at a temperature of 1200° C. for about one-half to one hour in a platinum crucible and pouring the glasses onto a graphite surface whereupon they were cooled to room temperature at room temperature conditions. These glasses had the natual color set forth below and turned to a darker color when exposed to ultraviolet radiation from an R–S sunlamp. The darker color faded quickly upon removal of the ultraviolet light source. The following batches all yield a base glass having a calculated composition in percent by weight of 20 percent $K_2O$, 17 percent $SiO_2$ and 63 percent $B_2O_3$.

EXAMPLE III

| Number | 1 | 2 | 3 | 4 | 5 | 6 | 7 |
|---|---|---|---|---|---|---|---|
| Batch ingredient, parts by weight: | | | | | | | |
| $AgNO_3$ | 1.00 | 0.75 | 0.8 | 1.0 | 1.0 | 0.75 | 0.75 |
| KCl | 0.5 | 0.5 | 0.3 | 0.25 | 0.3 | 0.25 | 0.25 |
| $B_2O_3$ | 10 | 10 | 10 | 10 | 10 | 10 | 12 |
| $K_2B_4O_7 \cdot 5H_2O$ | 20 | 20 | 20 | 20 | 20 | 20 | 24 |
| $SiO_2$ | 5 | 5 | 5 | 5 | 5 | 5 | 6 |
| Natural color | (1) | (2) | (2) | (3) | (4) | (2) | (3) |
| Induced (UV) color | (5) | (6) | (4) | (6) | (7) | (7) | (7) |
| Approximate sample thickness in centimeters | 0.55 | 1.05 | 0.95 | 1.05 | 1.05 | 1.05 | 1.25 |

[1] Light gray, opaque. [2] White, opaque. [3] Light brown, opaque.
[4] Light purple, opaque. [5] Dark gray, opaque. [6] Purple, opaque.
[7] Dark purple, opaque.

Translucent or opaque glasses containing relatively large silver chloride crystals are obtained by relatively longer and/or higher temperatures of heat treatment. As the heat treatment is at a lower temperature and/or for shorter lengths of time, the size of the silve chloride crystals is small enough to permit the glass to be transparent.

It was also found that the proportion of $K_2O$ in the potassium borate glasses has a significant effect on the solubility of silver chloride and upon the ability of the phototropic glass to lose its ultraviolet radiation induced color upon removal of an ultraviolet light source. Up to about 25 percent $K_2O$ in these glasses is desirable to increase the solubility of silver chloride in the glass, but more than this amount is undesirable for it reduces the ability of the color in the glass to fade when the untraviolet light is removed.

In the practice of the invention a particular minimum amount of silver chloride crystals per square centimeter of glass area is necessary for maximum phototropic coloration. Greater amounts do not appreciably increase the phototropic coloration because this minimum amount is sufficient to absorb practically all of the incident ultraviolet radiation. When less than this minimum amount of silver chloride crystals per square centimeter of glass area is present in the glass, the phototropic coloration is less because appreciably less than all of the incident ultraviolet light is absorbed. In order to obtain a noticeable phototropic coloration or darkening, there should be about 0.00005 gram of silver chloride crystals present per square centimeter of glass. In order to obtain somewhere near maximum phototropic coloration or darkening, there should be about 0.001 gram or more of silver chloride crystals present per square centimeter of glass.

Although the present invention has been described with reference to specific details of certain embodiments thereof, it is not intended that details be limitations upon the scope of the invention except insofar as set forth in the accompanying claims.

What is claimed is:
1. A phototropic article consisting essentially of a glass body having a composition consisting essentially of at least 63 percent by weight of boric oxide, 0 to 17 percent by weight of silica, and up to 25 percent by weight potassium oxide, and containing a silver halide, and in which the silver halide is soluble at the glass melting temperature and exhibits a positive temperature coefficient of solubility in said glass having in at least a portion thereof micro-crystals of at least one silver halide selected from the group consisting of silver chloride crystals, silver bromide crystals, silver iodide crystals and mixtures thereof.

2. A phototropic article according to claim 1 which contains at least 0.1 percent by weight to about 4.0 percent by weight silver based upon the weight of said glass and an amount of halide selected from the group consisting of chloride, bromide, iodide and mixtures thereof from about 0.1 percent by weight of said glass up to about 2.0 percent by weight of said glass.

3. A method of producing a phototropic borate glass which comprises heating the glass batch ingredients consisting essentially of 0.3 part potassium chloride, 0.5 part silver nitrate, 4.0 parts boric oxide, and 8.0 parts $K_2B_4O_7 \cdot 5H_2O$, until they become molten and form a homogeneous mixture, and thereafter thermally treating the glass to nucleate and precipitate micro-crystals of silver halide.

4. A method according to claim 3 in which the thermal treatment to nucleate and precipitate silver halide comprises slow, uniform cooling of the molten glass to solid form.

5. A method according to claim 3 in which the thermal treatment to nucleate and precipitate silver halide comprises cooling the molten glass to solid form at a rate in excess of that which permits nucleation and precipitation of silver halide, thereafter heating the glass to nucleate and precipitate silver halide, and thereafter cooling the glass to room temperature.

6. A phototropic article according to claim 1 wherein the glass body contains at least 0.1 percent by weight silver based upon the weight of said glass.

7. A phototropic article according to claim 2 in which the glass body consists of boric oxide, potassium oxide, and silica chloride.

References Cited

UNITED STATES PATENTS

| 3,197,296 | 7/1965 | Eppler et al. | 106—54 |
| 3,208,860 | 7/1965 | Armistead et al. | 106—54 |

OTHER REFERENCES

Chemical Abstracts vol. 40 (1946) Item 2717⁸—A. Dietzel—"Separation of Heavy Metal Halides in Glasses."

HELEN M. McCARTHY, Primary Examiner

U.S. Cl. X.R.
106—47; 65—33

PO-1050
(5/69)

UNITED STATES PATENT OFFICE
CERTIFICATE OF CORRECTION

Patent No. 3,594,198      Dated July 20, 1971

Inventor(s) Lowell L. Sperry

It is certified that error appears in the above-identified patent and that said Letters Patent are hereby corrected as shown below:

Column 1, line 56, "a" should be -- as --;

Column 2, line 16, "tempearture" should be -- temperature --;
line 24, "highter" should be "higher";
line 25, "O=" should be -- $O^=$ --;

Column 4, line 34, the caption "Ingredient" is missing;
line 60, "SiO" should be -- $SiO_2$ --;

Column 5, line 30, "silve" should be -- silver --;
line 56, "phototopic" should be -- phototropic --;

Claim 7, line 47, "silica chloride" should be

-- silver chloride --.

Signed and sealed this 14th day of March 1972.

(SEAL)
Attest:

EDWARD M. FLETCHER, JR.
Attesting Officer

ROBERT GOTTSCHALK
Commissioner of Patents